US007889662B2

(12) United States Patent
Lialiamou et al.

(10) Patent No.: US 7,889,662 B2
(45) Date of Patent: Feb. 15, 2011

(54) CHARGING IN TELECOMMUNICATIONS NETWORK

(75) Inventors: Helen Lialiamou, Pireaus (GR); Vesa Ilama, Helsinki (FI)

(73) Assignee: Nokia Corporation, Espoo (FI)

( * ) Notice: Subject to any disclaimer, the term of this patent is extended or adjusted under 35 U.S.C. 154(b) by 2197 days.

(21) Appl. No.: 10/478,724

(22) PCT Filed: May 28, 2001

(86) PCT No.: PCT/FI01/00511
§ 371 (c)(1), (2), (4) Date: Nov. 25, 2003

(87) PCT Pub. No.: WO02/098099
PCT Pub. Date: Dec. 5, 2002

(65) Prior Publication Data
US 2004/0152444 A1    Aug. 5, 2004

(51) Int. Cl.
*H04J 3/14* (2006.01)
(52) U.S. Cl. ............... 370/241; 370/254; 370/522
(58) Field of Classification Search ............ 370/241, 370/252, 522; 455/406; 379/114.03
See application file for complete search history.

(56) References Cited

U.S. PATENT DOCUMENTS 5,600,364 A    2/1997    Hendricks et al.
5,737,404 A *  4/1998    Segal ................ 379/230
6,463,275 B1 * 10/2002   Deakin ............... 455/406
6,546,247 B1 *  4/2003   Foti et al. ............ 455/433
6,819,652 B1 * 11/2004   Akhtar et al. ......... 370/230
6,931,005 B1 *  8/2005   Wilhelm ............. 370/390
2001/0033563 A1 * 10/2001 Niemela et al. ....... 370/349
2002/0127995 A1    9/2002 Faccinn et al.
2003/0109262 A1 *  6/2003 Scheurich ............ 455/456

FOREIGN PATENT DOCUMENTS

| RU | 2 165 679    | 4/2001  |
| WO | WO 99/53703  | 10/1999 |
| WO | WO 00/24161  | 4/2000  |
| WO | WO 00/45609  | 8/2000  |
| WO | WO 00/56029  | 9/2000  |

* cited by examiner

*Primary Examiner*—Kevin C Harper
(74) *Attorney, Agent, or Firm*—Mintz, Levin, Cohn, Ferris, Glovsky and Popeo, P.C.

(57) ABSTRACT

A method and a system for collecting session-specific event data in a telecommunications network where sessions are connected through a number of network entities which generate event data and have mutual signaling connections. The objective of the invention is to provide a solution whereby event detail records relating to one session but generated by a number of different network entities are sent in a centralized manner in real-time to a given collecting network entity. Thus, the event data combination is optimized and the unnecessary transmission of event detail records from one collecting network entity to another is avoided.

13 Claims, 7 Drawing Sheets

Fig. 1a

Prior art

CHARGING IN TELECOMMUNICATIONS NETWORK

FIELD OF THE INVENTION

The present invention relates generally to charging in a telecommunications network.

BACKGROUND OF THE INVENTION

A third generation mobile communications system is in Europe named UMTS (Universal Mobile Telecommunications System). It is a part of the International Telecommunications Union's IMT-2000 system. UMTS/IMT-2000 is a global wireless multimedia system, which provides higher transmission speed (2 Mbit/s) than the existing mobile networks.

UMTS and the General Packet Radio Service (GPRS) in the Global System for Mobile Communications (GSM) have been developed to provide wireless communications services packet-switched as well as circuit-switched environments.

Figure 1A:
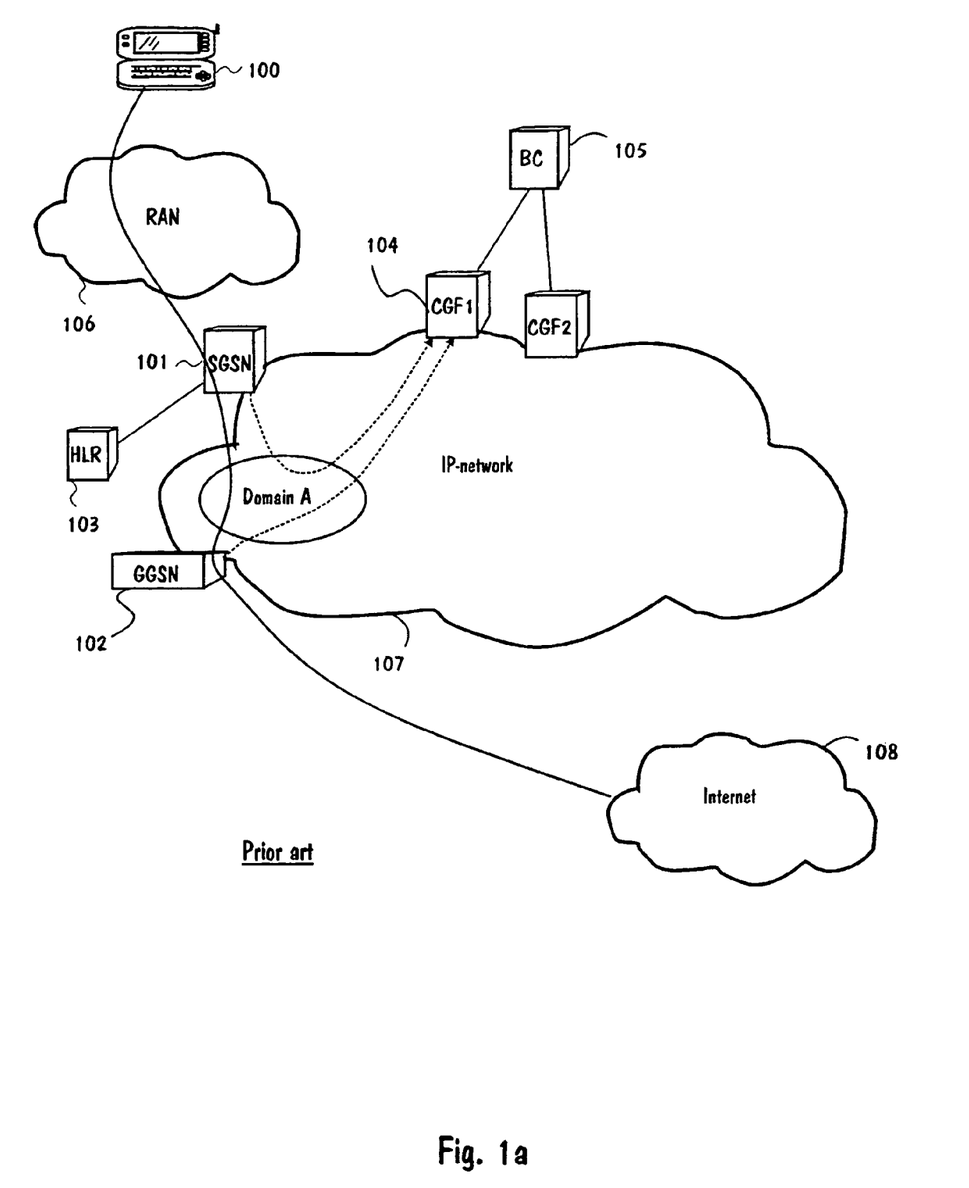
FIG. 1a illustrates with a simplified diagram a third generation mobile communications system.

FIG. 1a shows with a greatly simplified diagram the UMTS network. Only those network elements that are significant in view of the actual invention are shown. Of course, the network may contain one or more of each network element described in the following, depending on the capacity of the element, the number of mobile subscribers, and the organization of the network.

The user terminals 100 may be multi-mode terminals, which can operate using at least two radio access technologies, such as UMTS and GSM, for example.

A Gateway GPRS Support Node (GGSN) 102 is a gateway to external networks, and it acts as a router, routing data packets to and from the GPRS support node currently serving the given GPRS terminal.

A Serving GPRS Support Node (SGSN) 101 is at the same hierarchical level as the mobile switching center MSC. It maintains information about the GPRS terminal's location inside its service area and performs security and user access control functions. During data transfer the serving GPRS support node sends and receives data packets to and from the given terminal via a base station subsystem. The serving GPRS support node requests routing information and subscriber information from the Home Location Register (HLR) 103, where all subscriber information is permanently stored.

A UMTS specification allows a network subscriber to have one or more packet data protocol (PDP) addresses. Each of the addresses is described by one or more packet data protocol contexts in the user terminal, the serving GPRS support node, and the gateway GPRS support node. The packet data protocol context can be selectively and independently activated, modified and deactivated. All packet data protocol contexts of a subscriber are associated with the same Mobility Management (MM) context for the International Mobile Subscriber Identity (IMSI) of that subscriber. When the packet data protocol is set up, this means that a communication channel is set up.

In FIG. 1a the serving GPRS support node and the gateway GPRS support node are located in the same domain A. When a connection is to be set up between a subscriber and the Internet 108, for example, the first step is that a mobile terminal 100 sends an active packet data protocol context request through a radio access network (RAN) 106 to the serving GPRS support node 101. The message includes a variety of parameters, which further include a packet data protocol address and an Access Point Name (APN). The access point name is a logical name referring to the gateway GPRS support node to be used. Here the access point name refers to the gateway GPRS support node 102, through which the data packets are routed between the mobile terminal and the Internet. Several messages are sent between the said network elements before the connection is completed.

Event (Call/session) detailed data collection is always used when specified detailed information on an event (call/session) is required for billing or for the monitoring of event (call/session) details. Thus, each of the network elements collects data pertaining to each call/session until a certain predefined limit has been reached. The limit is a certain amount of data, time or other definable trigger values, such as a megabyte, for example. Then the network element generates an event detail record and sends it using an active protocol through the IP-network (Internet Protocol network) 107 to a Charging Gateway Function CGF1 104. In general, at least the following network elements generate event call detail records: the serving GPRS support node, the gateway GPRS support node, the call state control function (CSCF), and the Application Server (s) in radio access networks, such as a General Packet Radio Service (GERAN) or a UMTS Terrestrial Radio Access Network (UTRAN), the latter being a wideband multiple access radio network currently specified in the 3GPP (Third Generation Partnership Project). Normally, during one session each of the said network elements generates a number of event call detail records relating to the session.

The charging gateway function receives, for example, four event detail records pertaining to the same session from the serving GPRS support node and four from the gateway GPRS support node and then combines them with the help of a sequence number found in each event detail record. A formatted event call detail record is sent from the charging gateway function to a Billing Center (BC) 105 for processing.

A number of problems arise if the method described above is used as such in the latest release of the third generation mobile communications system. Some of the problems are briefly described with reference to FIG. 1b in the following.

Figure 1B:
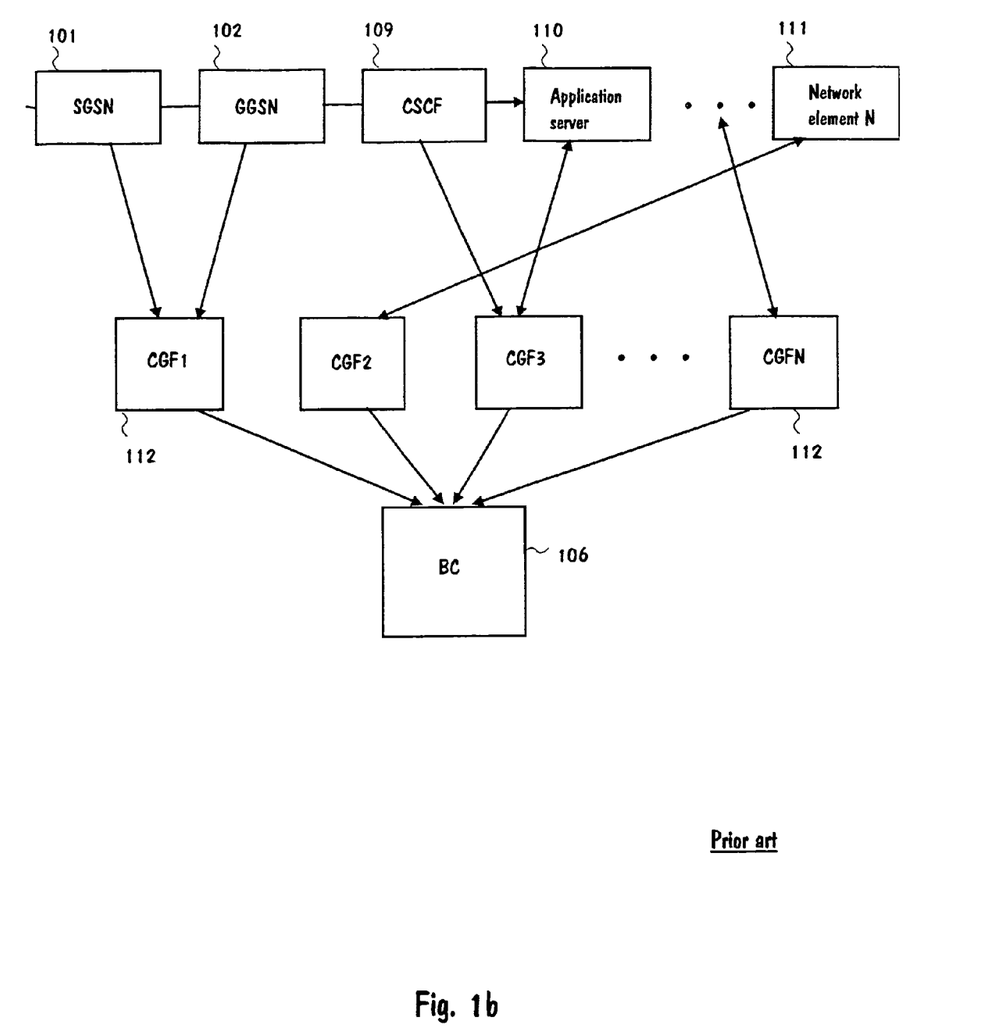
FIG. 1b depicts a prior art solution for sending call detail records in a tele-communications network.

Several millions event detail records are constantly generated in each of the network elements, such as the serving GPRS support node 101, the gateway GPRS support node 102, the call state control function CSCF 109, the application server 110, or some other network element N 111. Then each of the network elements independently passes the call detail records to a charging gateway function CGF1-CGFN 112. The problem is that at the moment there is no mechanism which would automatically in real-time centralize directly all the event detail records pertaining to one session for the specified charging gateway function (e.g. CGF1) in the network/domain concerned. By contrast, the event detail records are directed to a large number of different charging gateway functions. This leads to the problem of how to combine those event detail records pertaining to the same session/call. One solution is to use a standalone device, a so-called mediator, for collecting and combining the event detail records before sending them for further processing to the billing center 106. Combining the event detail records in the mediator is quite complicated and time-consuming.

One solution is to use a unique session identifier for combining the right event detail records. This kind of solution is described in the applicant's earlier U.S. patent application Ser. No. 09/577,152, which has not been published by the filing date of the present application. The identifier is called a global transaction ID (unique session identifier.)

However, that solution does not solve the time-consuming problem above, i.e. different network elements still send event detail records to different charging gateway functions.

SUMMARY OF THE INVENTION

The present invention relates generally to event detail record (EDRs) collection and management (related to charging, monitoring, lawful interception etc.) in a telecommunications network and specifically to post-paid and event detail records based pre-paid charging in a third generation mobile communications network.

The objective of the invention is to provide a solution whereby event detail records relating to one session but generated by a number of different network entities are sent in a centralized manner in real-time to a given collecting network entity. Thus, the event data combination is optimized and the unnecessary transmission of event detail records from one collecting network entity to another is avoided. The objective is achieved through a method and system characterized by what is stated in the independent claims.

The idea of the invention is to collect session-specific data in a given collecting etwork entity when user connections during a session are connected through a number of network entities generating event detail records and having mutual signaling connection.

Each of the network entities generating event detail records in a domain/network has a corresponding table including a set addresses of network entities collecting event detail records. The collecting network entity address is universally unique.

During connection set up a network entity which receives a connection/session establishment request selects an address for the collecting network entity from the said table and proposes that address to the network entities generating event detail records by inserting the address with a unique session identifier to a signaling message to be sent to the next network entity which generates event detail records.

When the network entity that generates event detail records receives the proposed address, it checks whether the address is configured in the table of collecting network entities.

If the proposed address matches a primary address of the collecting network entity in the configured table, the network entity sends the message further to the next network entity.

If the proposed address does not match the primary address of the collecting network entity in the configured table, the network entity checks whether the next address on the table matches and so on. If the address is found, the message is sent to the next network entity as above.

If the proposed address is not found in the table, the said network entity chooses the primary collecting network entity address from the table, replaces the proposed address with it, and sends the message to the next network entity.

In cases where the proposed collecting network entity is not in use or does not respond, the network entity in question replaces the proposed address by the next address from the configured table and sends the message to the next network entity.

All event detail records pertaining to the session/call in question are sent in real-time during the session/call to the same collecting network entity address thus selected.

The combining of the event detail records relating to the session is performed using the unique session identifier in this specified collecting network entity.

Thus, event detail records generated from several network entities related to one session/call are centralized in the same collecting network entity. This speeds up the actual combining of the event detail records.

The solution is dynamic and simplifies the transmission of the event detail records in the network regardless of whether the network entities are in the same or different networks/domains.

BRIEF DESCRIPTION OF THE DRAWINGS

The invention is described more closely with reference to the accompanying drawings, in which.

DETAILED DESCRIPTION OF THE PREFERRED EMBODIMENT

In the following, a dynamic real-time event detail record collection and management in a third generation mobile communications system or a All IP (3GPP rel.5) network is described. However, it is understood that the invention is not restricted to UMTS all-IP networks but can also be implemented in any kind of network where there is a need to use a dynamic real-time event detail record collection and management.

The idea of the method described in the following is to concentrate the transmission of event detail records produced in different network elements in a telecommunications network in a specified collecting network entity.

Hereafter the event detailed records will also be termed EDR, the serving GPRS support node termed SGSN, the gateway GPRS support node termed GGSN, the charging gateway function termed CGF, the application server termed AS, and the call state control function will be termed either CSCF or CPS (call processing server).

The invention is now described in detail with some examples referring to FIGS. 2-6. The event data is charging data and the network entities are network elements in the following example.

Figure 2:
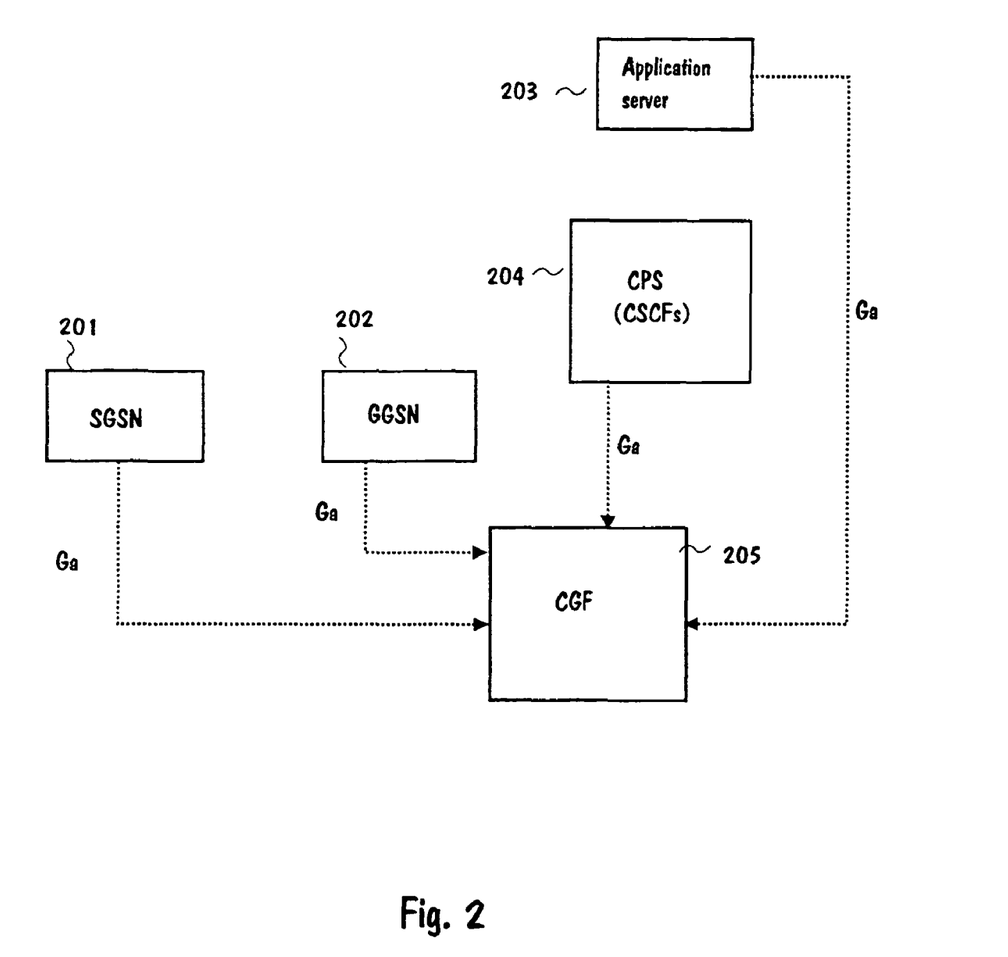
FIG. 2 shows as a block diagram an example of the implementation of the method according to the invention.

FIG. 2 illustrates one way of implementing the functionality required to increase the efficiency of charging.

To overcome the problem of time-consuming charging data combination and the irrelevant transmission of event detail records between different charging gateway functions, each network element in the domain/network sends the EDRs related to one session/call to the same CGF. Thus, the network elements SGSN 201, the GGSN 202, the application server 203, and the CPS 204 transmit all EDRs via a Ga interface in the UMTS all-IP network to the CGF 205.

It is important to note that this is just a very simplified example. Globally the UMTS network comprises several network elements, each of which is continually producing millions of event detail records.

Figure 3:
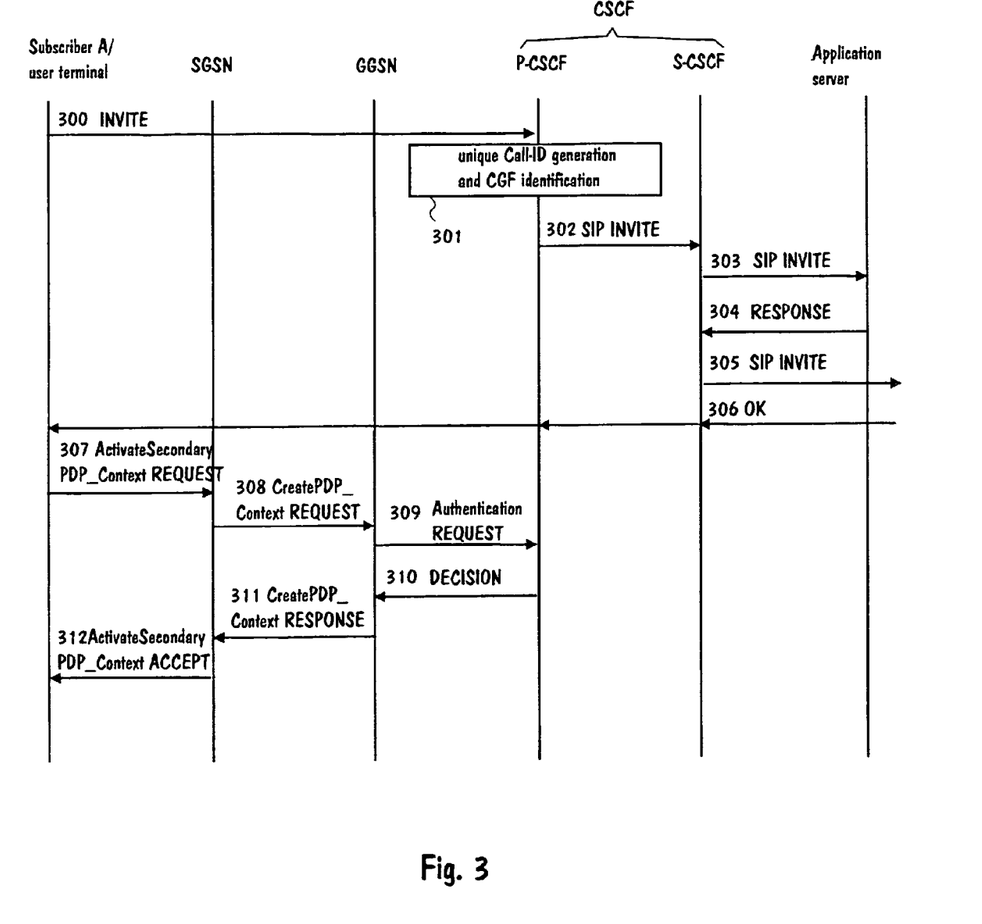
FIG. 3 is a signaling chart showing an example of a basic connection setup.

In FIG. 3 a voice call set up is considered as an example. A signaling diagram shows the basic connection setup in the 3GPP rel.5 network. The signaling messages mentioned here are just examples, and there can also be many other kinds of signaling messages. This example indicates only one of the possible ways of transferring the CGF address between network elements exchanging signaling messages pertaining to the call/session. Alternatively, the user terminal could also be involved in the process of transferring the unique session identifier and the CGF address.

The call set-up signaling is symmetric between the calling subscriber and the application server, on the one hand, and between the application server and the called subscriber, on the other. Therefore, it is enough to examine only one side of the signaling chart.

It is assumed that the packet data protocol PDP context has been activated. As already stated above, each packet data protocol context can be selectively and independently activated, modified, and deactivated.

A calling party, mobile subscriber A, wants to make a voice call to a called party, who in this particular example may be another mobile subscriber B. In spite of the voice call, the connection can also be a session, i.e. from the subscriber to a video server, or a network game, etc., depending on the user terminal and service providers.

The user terminal sends via the serving radio access network RAN, the SGSN, and the GGSN, an INVITE message 300 to a call state control function CSCF or more accurately to a proxy call state control function P-CSCF.

The call state control function CSCF can be divided into two logical parts, i.e. the CSCF can act as the proxy CSCF or a serving CSCF (S-CSCF). The CSCF handles several functionalities such as: acting as a first entry point and performs the routing of incoming calls; it reports call events for billing, auditing, intercepting, or other purposes; it may provide a server trigger mechanism; it receives and processes application level registration; it notifies the home domain of the initial user's access (e.g. the CSCF signaling transport address and the user ID).

The P-CSCF is a first contact point for the user terminal within the Internet protocol multimedia subsystem (IMS). Every user terminal always has a proxy CSCF associated with it and located in the same network.

The INVITE message 300 is a request "I want to establish a voice call connection to subscriber B". In response to the received message, the proxy CSCF generates a unique Call-ID, identifies from a configured list a charging gateway to be used as a primary charging gateway into which all EDRs generated during the call are sent, stage 301. These two unique parameters are stored into a memory, and the parameters are also added to the received message. The Call-ID is available for IP Multimedia Core Network Subsystem (IMS) EDRs.

From now on the said charging gateway is to be called by the name of proposed charging gateway function, proposed CGF, or proposed IPv6 CGF address (IPv6=Internet Protocol version 6).

At stage 302 the P-CSCF sends a SIP INVITE message, including the Call-ID and the IPv6 address of the proposed charging gateway, to the serving CSCF (S-CSCF) where the call/session states are handled. Then the P-CSCF starts to establish the call connection. The Call-ID is available for IMS EDRs.

The session initiation protocol SIP is an application level signaling protocol used for establishing sessions in an IP network. A session can be a simple two-way telephone call or a collaborative multimedia conference session. The SIP is a protocol for creating, modifying, and terminating sessions with one or more participants. It also supports user mobility and redirects requests to the user's current location.

The S-CSCF analyzes the destination address and determines whether the subscriber is of the same or a different network operator. The S-CSCF also checks whether the proposed CGF address matches the primary CGF address in the configured list of the CGF addresses. If the result of comparison is TRUE, i.e. the addresses are the same, all the EDRs produced in the S-CSCF relating to this particular call will be transmitted to the proposed CGF address. The proposed CGF address is included in messages between different network elements concerning this particular call in the beginning and during the call establishment phase. The checking of the proposed CGF address from the configured list of the CGF is repeated from now on by every network element receiving the messages pertaining to this call.

If the proposed address does not match the primary address of the charging gateway function in the configured list, the network element chooses the next charging gateway function address from the list, replaces the proposed address with it, and sends the message along with the unique session identifier to the next network element.

Also in cases where the proposed charging gateway function is not in use or does not respond, the network element in question replaces the proposed address with the next address from the configured list.

Next, at stage 303 a SIP INVITE message along with the Call-ID and the IPv6 address of the proposed charging gateway is sent from the S-CSCF to an application server. The Call-ID is available for application server EDRs. The application server acknowledges the received message by sending the RESPONSE message 304 to the S-CSCF.

In response the S-CSCF sends the SIP INVITE message 305 including the Call-ID and the IPv6 address of the proposed charging gateway to an interrogating CSCF (I-CSCF). The I-CSCF is the contact point within an operator's network for all connections destined to a subscriber of that network operator. The Call-ID is available for IMS EDRs.

The first task is now to find out where the called subscriber is located and whether the subscriber's mobile terminal is free to take a voice call.

When the location of the mobile terminal is made known and it is free to receive calls, the OK message 306 informing that the connection can be established is sent from a network element such as S-CSCF located in some other operator's network. The message is sent via the CSCF, the GGSN, and the SGSN to the user terminal of the subscriber A.

Thus far the messages between the above network elements have been transmitted through signaling channels, i.e. no traffic channel has been assigned yet. Messages on the lower part of the signaling chart are needed for media/traffic path establishment.

At stage 307 the user terminal sends to the SGSN an ActivateSecondaryPDP_Context REQUEST message, and the SGSN forwards the CreatePDP-Context REQUEST message 308 to the GGSN. In response to the received message the GGSN generates a Charging-ID, which is available for SGSN and GGSN EDRs. After that the GGSN sends the Authentication REQUEST message 309 to the P-CSCF, which may be based on COPS (common open policy service protocol) messages, for example.

The policy control function is a logical entity, and it controls which packets are allowed to pass through the GGSN. In response to the message the P-CSCF informs the GGSN of its decision on authorizing the PDP Context Activation by sending a DECISION message 310, including the Call-ID and the IPv6 address of the proposed charging gateway. This call-ID is available for PS EDRs.

The next step is that the GGSN responds to the SGSN with a CreatePDP_Context RESPONSE message 311, including the call-ID, the Charging-ID, and the IPv6 address of the proposed charging gateway. The Call-ID and the Charging- ID are available for PS EDRs. At stage 312 the SGSN sends an ActivateSecondaryPDP_Context ACCEPT message to the user terminal.

All EDRs pertaining to this call are sent automatically from each of the network elements described above to the proposed CGF.

In the following, the present invention is illustrated with three examples in reference to FIGS. 4-6.

Figure 4:
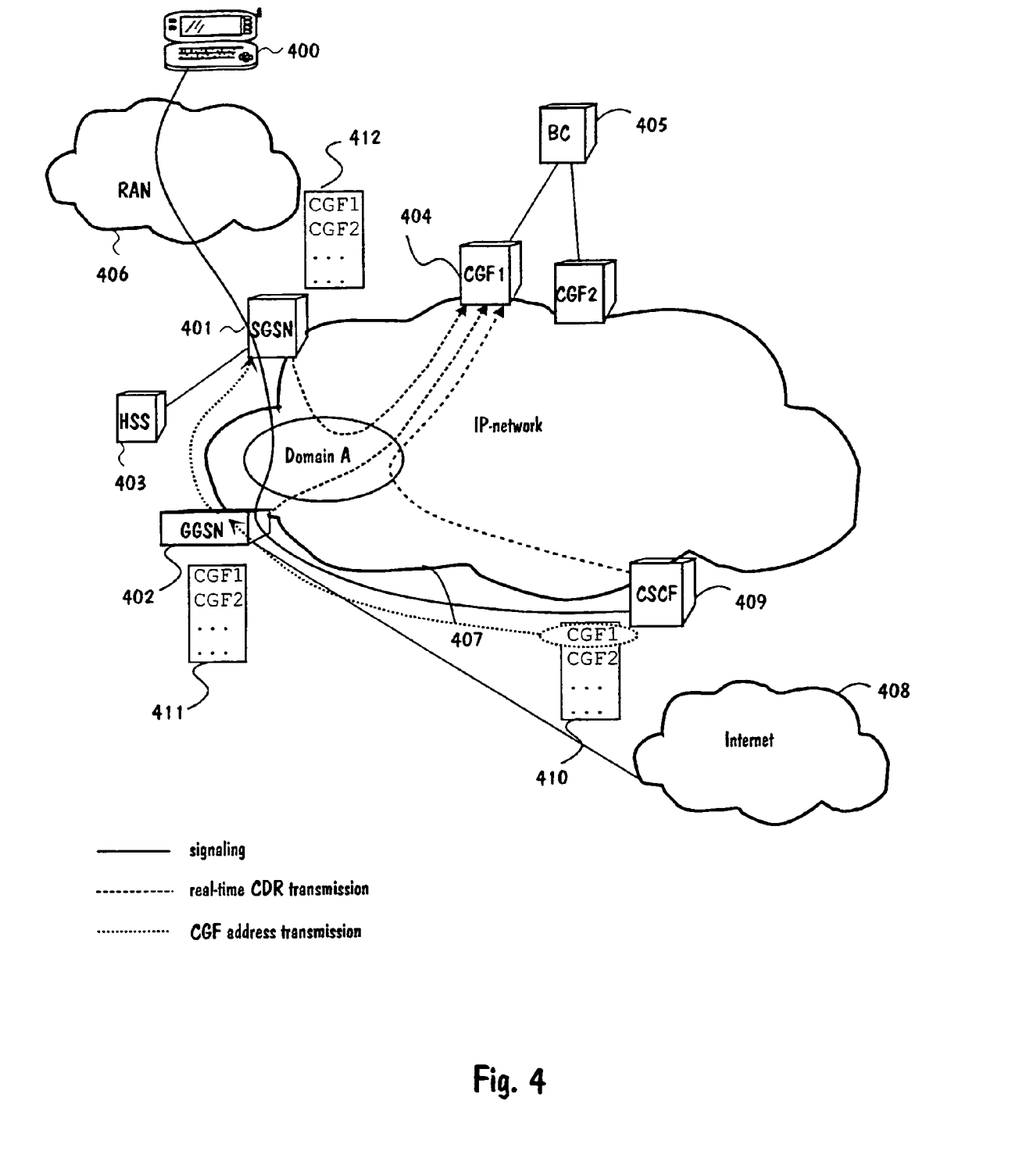
FIG. 4 illustrates a charging gateway address transmission in one domain in the third generation mobile communications network.

FIG. 4 illustrates a process of sending the unique charging gateway address to be used in one domain in the third generation mobile communications system. The unique Call-ID is also transmitted along with the charging gateway address as described above.

The numbering in FIG. 4 corresponds to the numbering in FIG. 1 so that the network elements and networks 100-108 correspond to the network elements and networks 400-408. Home Subscriber Services (HSS) register 403 is enhanced with a Home Location Register (HLR).

The packet data protocol PDP context has been activated, i.e. the signaling channel is created between the user terminal 400 and the call state control function 409. The user terminal has requested connection establishment to a called subscriber. Alternatively, the subscriber of the user terminal might wish to connect to an application server that serves multimedia, video, games, etc. The signaling messages needed when the connection is set up are sent via the SGSN 401 and the GGSN 402 to the CSCF. The CSCF analyzes the content of the received message, e.g. the call set up request, and performs actions such as forwarding the request to a CSCF located in another operator's network. It is shown in FIG. 4 that each of the network elements, i.e. the SGSN 401, the GGSN 402 and the CSCF 409, has a configured list of charging gateway function address 410-412. The CSCF selects from the list 410 the charging gateway function address CGF1 to be used by all network elements involved in the session in question. The proposed charging gateway function address is sent along with the message to the GGSN, which in turn sends it along with the message to the SGSN. The message transmission and the checking of the proposed charging address are carried out as above. The lists in the network elements correspond to one another.

Figure 5:
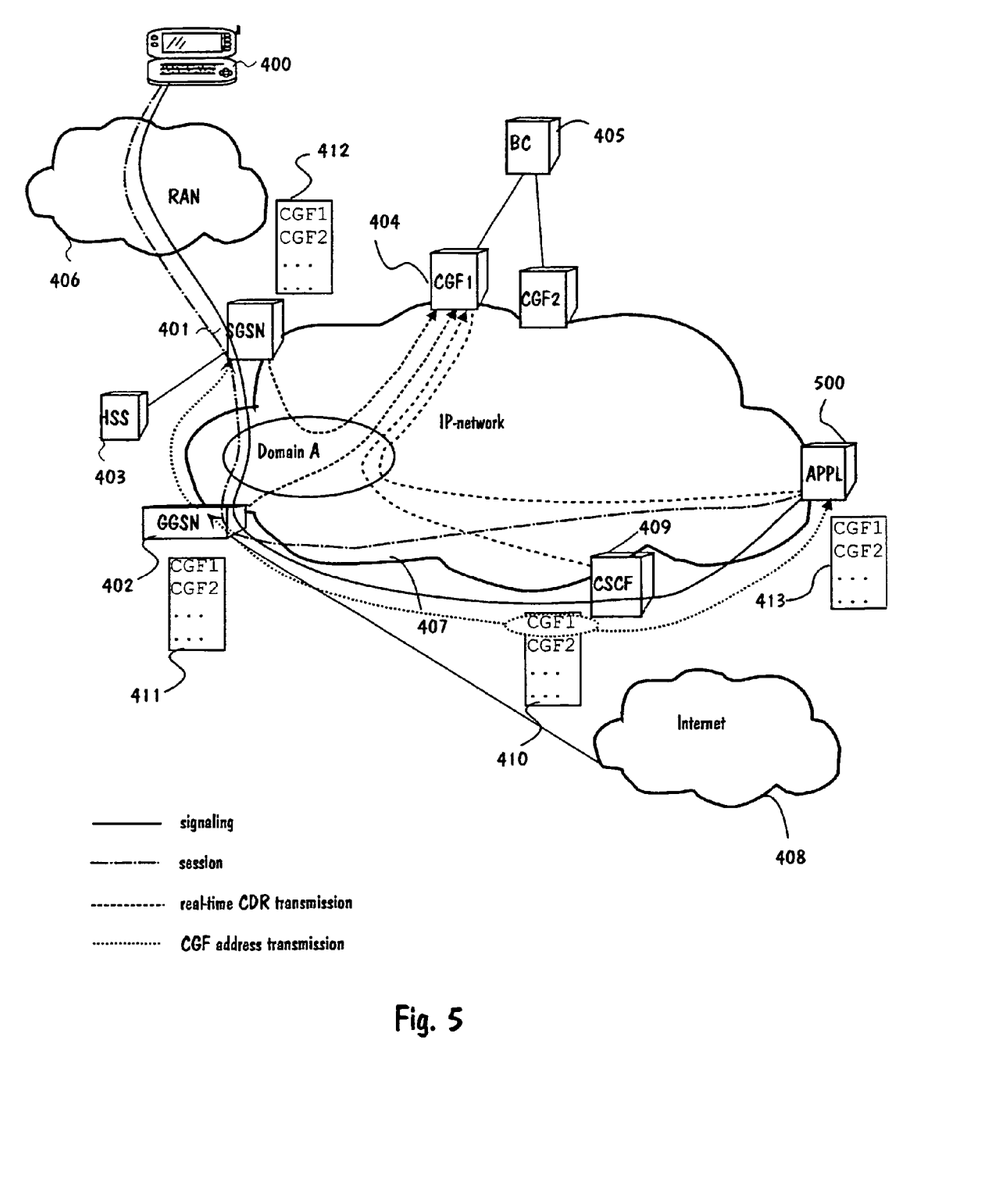
FIG. 5 illustrates a charging gateway address transmission in one domain in the third generation mobile communications network.

FIG. 5 also illustrates a process of sending the unique charging gateway address in one domain in the third generation mobile communications system. In the figure the packet data protocol PDP context has been activated between the user terminal and the application 500, and the connection between the user terminal and the application is set up and activated. The CSCF informs the application in the message (described in FIG. 3) of the proposed CGF to be used during the connection. Messages between the CSCF and the application are sent at the application layer.

Figure 6:
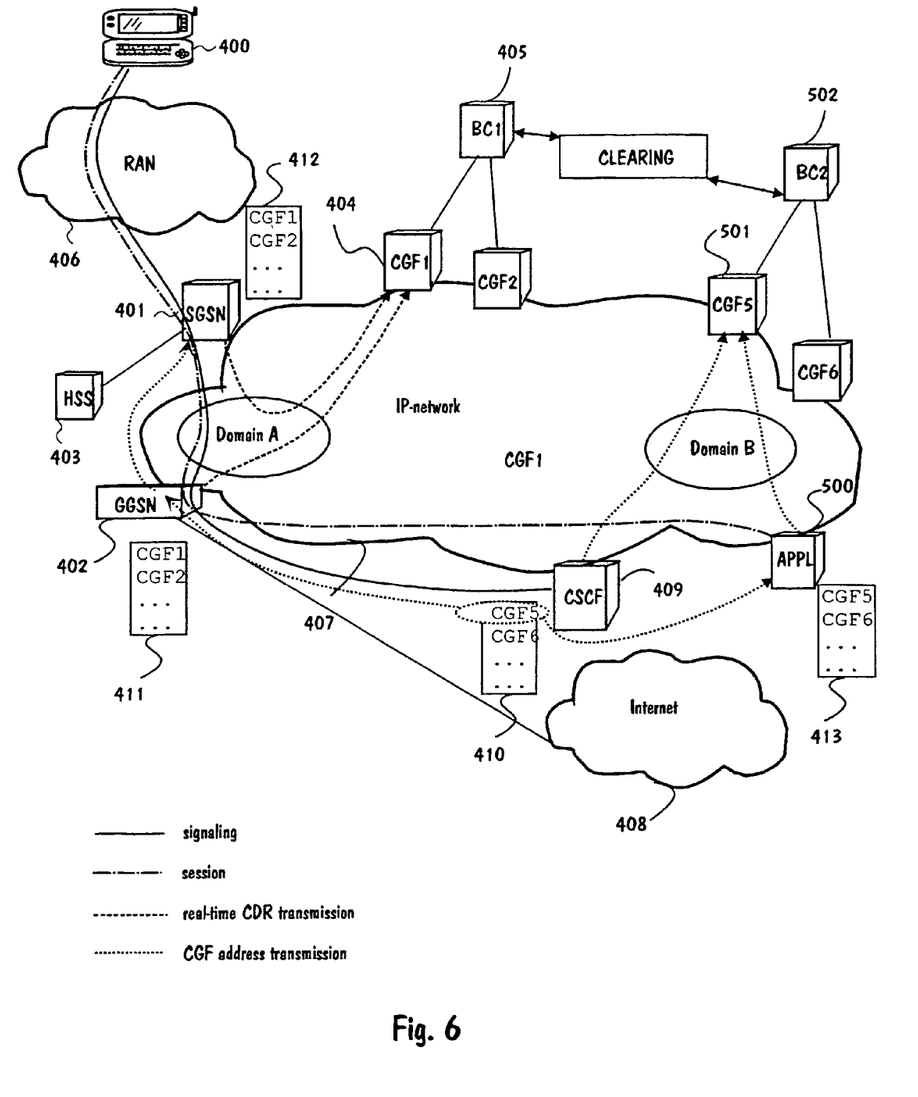
FIG. 6 illustrates a charging gateway address transmission in two domains in the third generation mobile communications network.

FIG. 6 illustrates a process of sending the unique charging gateway address in two domains of the third generation network.

Operator A owns the network in domain A, and operator B owns the network in domain B. The configured lists differ from each other in the network elements of different network owners. The CSCF 409 proposes the CGF5 address to the GGSN 402, but the GGSN does not find the proposed address from its own list. In this case the GGSN selects from its list a primary charging gateway function CGF1, replaces the CGF5 address with it, and forwards the message to the SGSN.

A subscriber may simultaneously have a number of active calls/sessions' such as a voice call, e-mail, a video session. With the help of the unique identifier, it is possible to trace in detail the charging information generated e.g. distinguish from the charging information as to how much data volume was transferred during the voice call, the e-mail, or the video session.

By means of the unique session identifier along with the unique charging gateway address, which are sent from one network element to the next network element, it is possible to achieve fast, clear, and dynamic charging as well as activities relating to monitoring, collecting statistics, and lawful interception.

Although the invention is designed to be especially suitable for the third generation mobile communications system, the invention is not limited to application for such system. It is clear that the described charging method and system can be installed in networks of any kind. Of course, also the user terminal can be of any kind. In addition, the unique session identifier and the CGF address can be delivered to the user terminal and then to the other network elements generating charging data in order to ensure that the unique session identifier and the CGF address are delivered to all those network elements involved in the session/call in question.

Implementation and embodiments of the present invention have been explained above with different examples. However, it is understood that the invention is not restricted by the details of the embodiments above and that numerous changes and modifications can be made by those skilled in the art without departing from the characteristic features of the invention. The described embodiments are to be considered illustrative but not restrictive. Therefore the invention should be limited only by the attached claims. Thus, alternative implementations defined by the claims, as well as equivalent implementations, are included in the scope of the invention.

What is claimed is:

1. A method, comprising:
choosing, by a first network entity, from a stored set of addresses for network entities collecting event data, one address of a network entity collecting event data for a session from the set of addresses during connection set-up of the connection;
signaling, by said first network entity, the chosen address as a proposed address between two or more network entities configured to generate event data; and
sending, by said first network entity or another network entity, event data generated during the session to the chosen address, wherein a universally unique identifier pertaining to the said session is inserted in the signaling, wherein a user terminal is involved in transferring the chosen address between network entities generating event data.

2. A method according to claim 1, wherein the address of the collecting entity is universally unique.

3. A method according to claim 1, further comprising in a second network entity generating event data:
receiving a signaling message including a proposed address, and comparing the proposed address with the stored set of addresses, wherein in the choosing step the chosen address is the proposed address, if the proposed address is found in the stored set of addresses, and the chosen address is an address from the stored set of addresses, if the proposed address is not found from the stored set of addresses.

4. A method according to claim 3, wherein the chosen address is a primary address of the stored set, if the proposed address is not found from the stored set.

5. A method according to claim 3, further comprising sending a signaling message comprising the chosen address to at least a further network entity.

6. A method according to claim 1, further comprising choosing a next address from the stored set of addresses, if the network entity collecting event data having the chosen address is not responding or is not in use.

7. A method according to claim 1, wherein the network entities are network elements.

8. A method according to claim 1, wherein the content of the set of addresses is identical at least in network entities within the same domain.

9. A method according to claim 1, wherein the content of the set of addresses is identical at least in network entities within the same network.

10. A method according to claim 1, wherein the stored set of addresses in the network entities generating event data is in the form of a table.

11. A method according to claim 1, wherein the event data includes charging data.

12. An apparatus, comprising:
- a processor configured to choose, from stored set of addresses for network entities collecting event data, one address of a network entity collecting event data for a session;
- signaling circuitry configured to signal the chosen address as a proposed address between two or more of said apparatus; and
- a transmitter configured to send event data generated during the session to the address chosen by the processor;
- comparing circuitry configured to compare the proposed address to the stored set of addresses, wherein the processor is configured to choose either:
- the proposed address if the proposed address is found in the stored set of addresses, or an address from the stored set of addresses if the proposed address is not found from the stored set of addresses.

13. An apparatus comprising:
- a processor configured to choose, from stored set of addresses for network entities collecting event data, one address of a network entity collecting event data for a session;
- signaling circuitry configured to signal the chosen address as a proposed address between two or more of said apparatus; and
- a transmitter configured to send event data generated during the session to the address chosen by the processor, wherein the processor is configured to choose a primary address of the stored set of addresses as the chosen address, if the proposed address is not found from the stored set.

* * * * *